United States Patent [19]

Stanfield

[11] Patent Number: 4,979,814
[45] Date of Patent: Dec. 25, 1990

[54] VIEWING OF DEVELOPED ROLL OF SLIDE FILM

[76] Inventor: James S. Stanfield, P.O. Box 1983, Santa Monica, Calif. 90406

[21] Appl. No.: 827,789

[22] Filed: Feb. 7, 1986

[51] Int. Cl.⁵ .............................................. G03B 21/00
[52] U.S. Cl. ........................................ 353/95; 353/68; 353/96; 40/366
[58] Field of Search ................... 353/21, 25, 26 R, 68, 353/95, 96, 120, 108; 40/361-367; 206/455, 456; 352/129, 130

[56] References Cited

U.S. PATENT DOCUMENTS

| | | | |
|---|---|---|---|
| 3,605,304 | 9/1971 | Broekman | 40/366 |
| 3,628,856 | 12/1971 | Jungjohann et al. | 353/68 |
| 3,707,052 | 12/1972 | Clark | 40/363 |
| 3,712,725 | 1/1973 | Eckerdt | 353/68 |
| 4,431,282 | 2/1984 | Boser | 40/364 |
| 4,491,434 | 1/1985 | Barr et al. | 40/366 |

FOREIGN PATENT DOCUMENTS 853298 3/1940 France ......................... 353/95

*Primary Examiner*—William A. Cuchlinski, Jr.
*Assistant Examiner*—Patrick R. Scanlon

[57] ABSTRACT

Apparatus is described for the detailed viewing of a strip of 35 mm slide film which is enclosed in a transparent jacket. The apparatus includes a projector with a film gate which is wide enough to pass the jacket, and which projects sufficient area to include the frame number which lies under each picture frame. The apparatus enables a person to view the details of a developed roll of slide film, in its jacket, and to select particular frames for making prints or mounted slides.

7 Claims, 2 Drawing Sheets

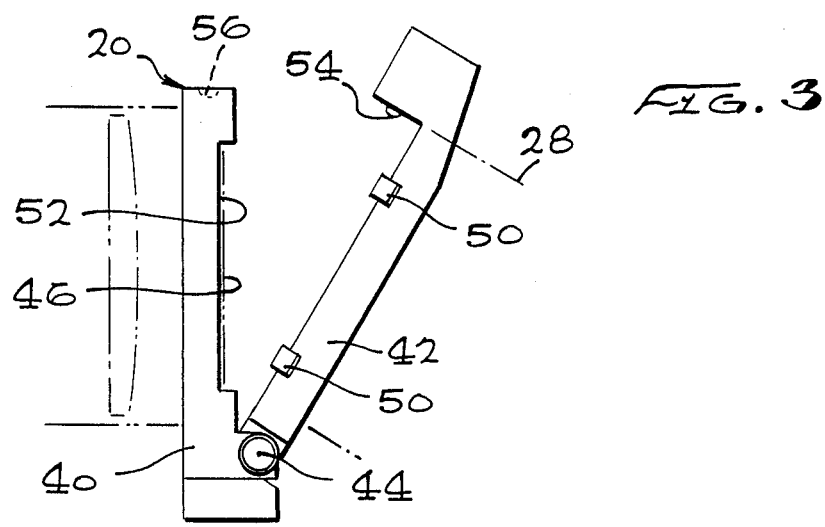
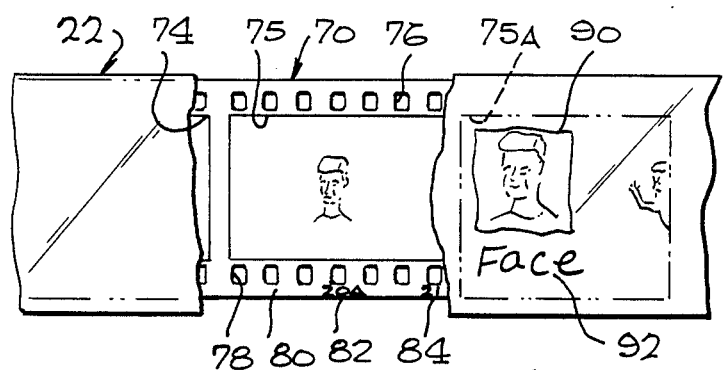
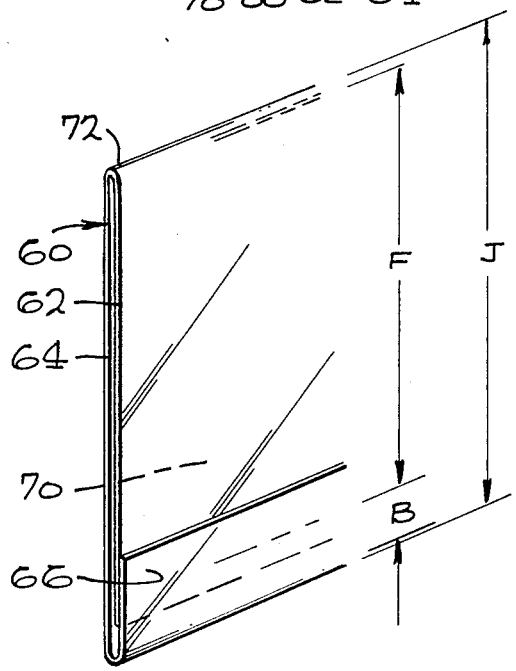

VIEWING OF DEVELOPED ROLL OF SLIDE FILM

BACKGROUND OF THE INVENTION

Photographers who wish to take pictures and obtain prints (photographic copies made from negatives) can use either negative film or slide film. It is very difficult to interpret negative film, so a print is usually made of every frame. Often, only a few pictures turn out good enough that prints are desired, and yet the photographer pays for prints of every frame. A roll of slide film can be developed, and either the developed roll placed in a transparent jacket or each frame held in a separate slide mount. Having the frames cut and mounted in slide mounts adds additional cost, and the individual mounted slides from a roll of perhaps 36 pictures, can be more difficult to handle than a single strip of jacketed film. It is possible to obtain a jacketed strip of slide film and hold it up to the light to select frames from which prints are to be made. However, it is difficult to determine the fine details of a picture just by viewing it unaided. A magnifying glass can help, but this is cumbersome and fine details cannot be seen as well as when the frame is projected on a screen that is orders of magnitude larger than the frame.

It would not be convenient to take the strip of film out of the protective jacket and view it by means of a film strip projector, since such viewers would show only half of a picture frame at a time and the projected image would be rotated 90°. Also, it is inconvenient to remove a film strip from a jacket and later replace it in the jacket. In addition, extra effort is required to keep track of a particular film frame which looks good, to make sure the correct frame number is being mounted and/or copied. An apparatus which facilitated the selection of frames from a developed roll of slide film, would reduce the cost of obtaining prints or mounted slides, to thereby enable photographers to take a large number of pictures without being constrained by high costs.

SUMMARY OF THE INVENTION

In accordance with one embodiment of the present invention, an apparatus and method are provided which enable the viewing of details of a long strip of jacketed slide film. The apparatus includes a projector with a film gate having opposite ends for passing a strip therethrough and a projection lens for projecting an image of a film frame onto a screen. The gate is wide enough to pass the jacket that lies around a 35 mm strip of developed slide film, to permit the viewing of a film frame while it lies in the jacket. The projection lens is positioned to project not only the picture frame, but also a region under it which includes the area where frame numbers are marked on slide film, so that a person viewing the picture frame also sees the frame number.

An adaptor can be provided that mounts on a prior slide projector and which uses the prior projector's projection lens.

The novel features of the invention are set forth with particularity in the appended claims. The invention will be best understood from the following description when read in conjunction with the accompanying drawings.

BRIEF DESCRIPTION OF THE DRAWINGS:

FIG. 3 is a side elevation view of the film gate device of the apparatus of FIG. 2, showing it in an open position.

FIG. 4 is a view of a portion of the strip of jacketed slide film of FIG. 1, with a portion of the figure showing the film without the jacket thereabout.

FIG. 5 is a partial perspective view of the strip of jacketed slide film of FIG. 4.

Figure 1:
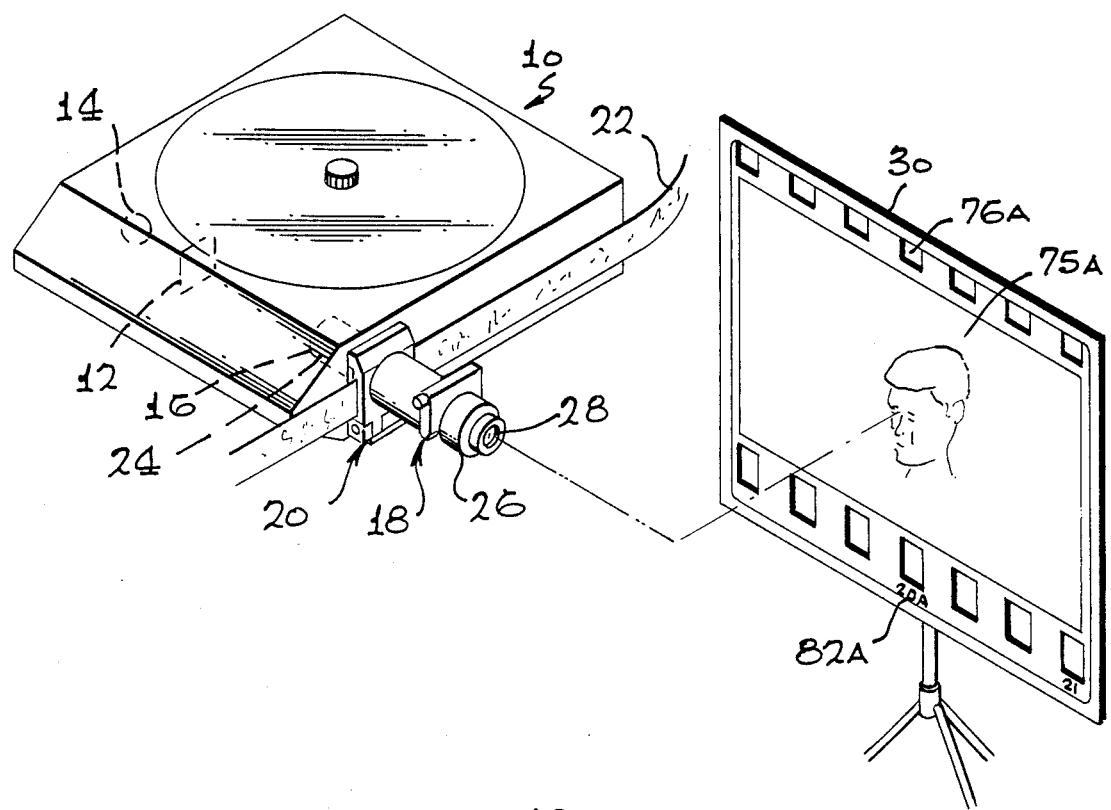
FIG. 1 is a perspective view of an apparatus for viewing a strip of jacketed slide film the screen being shown at an angle to facilitate understanding.

DESCRIPTION OF THE PREFERRED EMBODIMENTS:

FIG. 1 illustrates a prior art slide projector 10 of a carousel type, which holds multiple slides in a circular stack, and which ejects individual mounted slides to a slide showing position 12 in a slide showing plane. Light from a source 14 passes through a slide at the position 12, and can pass through a projection lens at the position of a lens mount 16 which projects the image of the slide onto a large screen. Applicant provides a viewing apparatus in the form of an adaptor 18 which can be installed in the projector at the position of the mount 16 where the previous projection lens lay, to enable the projection of jacketed slide film. The adaptor 18 includes a film gate device 20 which passes a strip 22 of jacketed 35 mm slide film, a light concentrating assembly 24 at the position of the mount 16 that concentrates light onto the strip at the film gate, and a projection lens holder 26 which holds a projection lens 28 that can project the image of film onto a screen 30.

Figure 2:
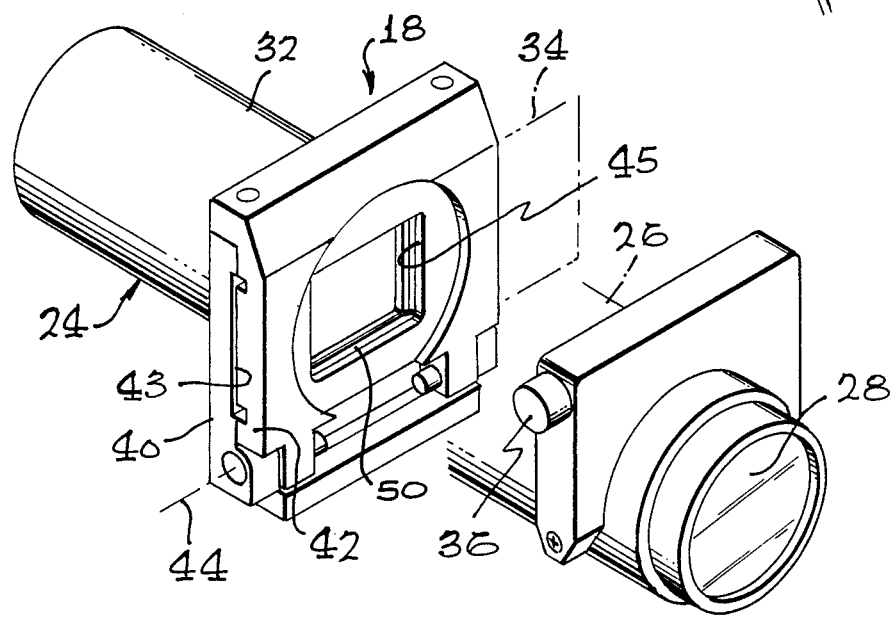
FIG. 2 is a partial perspective view of the apparatus of FIG. 1.

As shown in FIGS. 2 and 3, the light concentrating assembly 24 includes a tube 32 that fits into the mount 16 of the projector where the light concentrating lens used to be. The light concentrating assembly 24 concentrates the light onto a film plane 34 (lying forward of the slide showing plane at 12) where the jacketed film will lie, and also serves to hold the adaptor in place in the projector 10. To use the adaptor, the projection lens of the projector is removed and placed in the projection lens holder 26. An adjustment mechanism 36 allows the remounted projection lens 28 to be moved to focus the image on a screen. Many projectors have expensive projection lens, and the ability to use such a lens enables sharp images to be projected with an adaptor of modest cost.

The film gate device 20 is mounted to the front of the light concentrating assembly. The film gate device includes rearward and forward parts 40, 42 forming a slot 43 between them which has open opposite ends and forming a frame gate 45 defining the area of film to be imaged on a screen. The parts 40, 42 are pivotally mounted about a lower axis 44. The parts form a strip holding position indicated at 46 lying in the film plane and between the two gate parts. The forward part carries a pair of leaf springs 50 which, when the gate device is closed, press a film strip against a surface 52 of the rear part. A spring biased latching device 54 on the forward part, can enter a recess 56 on the rearward part, to keep the gate closed when it is moved to the closed position. The gate can be opened by pressing down on the projection lens holder 26, which is coupled to the light concentrating assembly through the gate device.

The ability to open the gate facilitates the placing of a particular picture frame of a long strip into the projection location 46 where the image of the strip will be projected onto a screen.

FIGS. 4 and 5 illustrate portions of a strip of jacketed slide film 22. As shown in FIG. 5, the jacket 60 includes a strip of transparent material with a front sheet portion 62, a rear sheet portion 64, and a bottom flap 66. A strip of 35 mm film 70 is shown lying within the jacket 60. Typical practice of developers is to place the 35 mm film up against the fold 72 where the tops of the front and rear sheet portions 62, 64 of the jacket are joined. While 35 mm film has a width F of 35 mm, the jacket has a width J of about 39 mm. The bottom of the jacket, of a width B of about 4 mm does not contain any portion of the film.

As shown in FIG. 4, the film includes a sequence of picture frames 74 between two rows of sprocket holes 76, 78. The lower edge portion 80 of the film, below the lowermost row of sprockets 78, includes markings such as 82 and 84 at every forth sprocket hole, which define half frames and full frames of film. The particular strip shown in FIG. 4 shows the marking "20A" at the middle of the area under the picture frame 75. When the photographer views a particular film frame 75 and finds that it represents a desirable image, he may decide to have a print or mounted slide made. It is highly desirable that the frame number 82 be visable, so the photographer can readily note the number to instruct the processing firm. This is especially important where several sequential frames are of the same subject in the same position, so confusion can arise if the frame is taken out of the viewing apparatus. FIG. 1 shows that the screen 30 displays not only an image of the picture frame at 75A, but also displays the area of the film under the picture frame, and specifically displays an image 82A of the frame number. Only a portion of the upper row of sprocket holes is projected at 76A, since no frame numbers typically appear at the top of the film.

The area of the front projection screen 30 generally should be at least 100 times the area of the film frame portion which is projected onto the screen. This permits both the horizontal and vertical dimensions of any feature in the frame to be magnified by at least one order of magnitude. While any magnification is helpful in seeing details, at least two orders of magnitude of enlargement of the frame size is necessary to see fine details. This is especially important where a frame of the slide film strip is to be later projected onto a similar size screen for viewing by an audience. For a 35 mm frame where the picture frame portion has dimensions of about 24 mm×36 mm, a projection screen having an area of more than one square foot is required to obtain at least an order of magnitude of magnification of width and height of each feature.

The projector apparatus is useful in allowing the storage of film for archival purpose, while permitting it to be clearly shown whenever desired. The jacket protects the film from dust and scratching. Yet applicant has found that a clear image can be projected despite the presence of the jacket. Applicant has found that it is difficult to notice any difference between an image projected from jacketed film and an image projected from unjacketed film.

Thus, the invention provides apparatus for viewing a strip of jacketed 35 mm slide film in a manner that permits viewing of fine details of each picture frame, as well as the number of that frame on the strip. This minimizes the cost for the photographer up to the point when he decides which frames if any are to be used to make a print or to be mounted as a slide in his collection which he will want to project.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for viewing a strip of jacketed 35 mm slide film which includes a pair of opposite edge portions, a row of sprocket holes along each edge portion, a sequence of picture frames in a middle region, between the rows of holes, and a frame number marking adjacent to each picture frame on a side of a row of holes opposite the middle region, comprising:

a projector having a light source, optical means for concentrating light from said source onto a film plane, a film gate with a slot located at said film plane and having open opposite ends for passing a strip therethrough, and a projection lens for projecting an image of film at said film plane onto a screen;

said gate being wide enough to pass the jacket that lies around a 35 mm strip of developed slide film, and said projection lens projecting the frame number lying adjacent to a picture frame as well as the picture frame, onto the screen.

2. The apparatus described in claim 1, including:

a screen having an area at least two orders of magnitude greater than the area of one picture frame of said film, said projection lens projecting an image on said screen which image has an area at least two orders of magnitude greater than one of said picture frame, whereby to enable examination of fine details of an image.

3. In the editing of frames on a strip of 35 mm slide film which has two rows of sprocket holes and which has been developed with frame numbers under each frame under the lower row of sprocket holes, and which has been placed in a transparent jacket to form a jacketed strip of slide film, the improvement comprising:

placing a portion of said jacketed strip, which includes said strip and jacket, in the film plane of a projector and sequentially moving said slide film and projecting the image on each of the frames of the strip, and the frame number lying under the frame onto a screen, while each frame lies in the jacket.

4. The improvement described in claim 3 including:

placing a mark on said jacket substantially in the form of a closed curve, to indicate substantially the only area of a frame to be included in a print made from the frame; and making a print copy of the image within said closed curve.

5. An adaptor for mounting on a slide projector which has a housing, means for holding individual mounted slides in a noncoplanar arrangement and moving individual mounted slides into a slide showing plane, a light source, a lens mount, and a projecting lens removably holding in said lens mount for focusing an image of a slide lying at the slide showing plane onto a screen, the adaptor being useful in the detailed viewing of developed 35 mm slide film which is enclosed in a jacket that is wider than the film, comprising:
- a light concentrating assembly which can fit into said lens mount in place of the projecting lens, and which concentrates light from said source onto a film plane lying forward of said slide showing plane;
- a gate device which is mounted to the front of said light concentrator assembly, and which has a slot at said film plane, said gate device having a frame gate;
- a lens holder which is coupled to said light concentrating assembly and which can hold said projection lens which previously laid in said lens mount, said lens holder holding the projection lens so it can form an image of the slide film portion lying within said frame gate onto a screen;
- said developed 35 mm slide film including a sequence of picture frames, a lower row of sprocket holes lying below said picture frames, and a frame number lying beneath each picture frame below the row of sprocket holes; and
- said frame gate slot being large enough to pass said jacket with the film therein, and said projection lens being constructed and positioned to project onto said screen a picture frame and a frame number which lines under the picture frame under the row of sprocket holes.

6. Apparatus for viewing a strip of jacketed 35 mm slide film which includes a sequence of picture frames, a row of sprocket holes above and below the picture frames, and a frame number marking below each picture frame, and wherein the jacket is a plurality of millimeters wider than the film; comprising:
- a projector having a light source, optical means for concentrating light from said source onto a film plane, a film gate with a slot located at said film plane and having open opposite ends for passing a strip therethrough, and a projection lens for projecting an image of film at said film plane onto a screen;
- said gate being wide enough to pass the jacket that lies around a 35 mm strip of developed slide film onto the screen, and said lens and gate being formed to project an area of said slide film having a width great enough to include the picture frames, the lower row of sprocket holes, and the area containing numbers below the lower row of holes onto the screen.

7. The apparatus described in claim 6, including:
- a screen having an area at least two orders of magnitude greater than the area of one picture frame of said film, said projection lens projecting an image on said screen which image has an area at least two orders of magnitude greater than one of said picture frame, whereby to enable examination of fine details of an image.

* * * * *